Jan. 25, 1949.  R. GILLIS  2,459,877
APPARATUS FOR MAKING MULTIPLY CABLE SHEATHS
Filed April 25, 1944
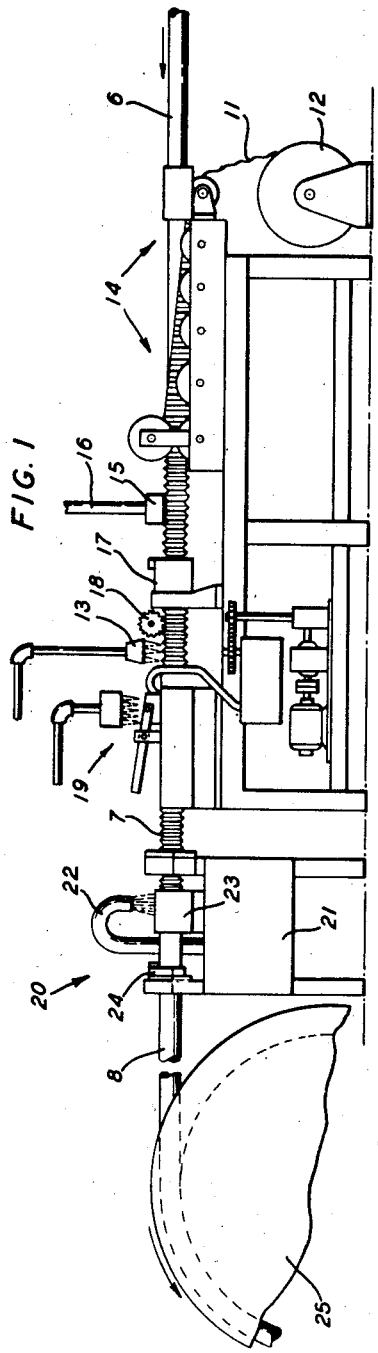
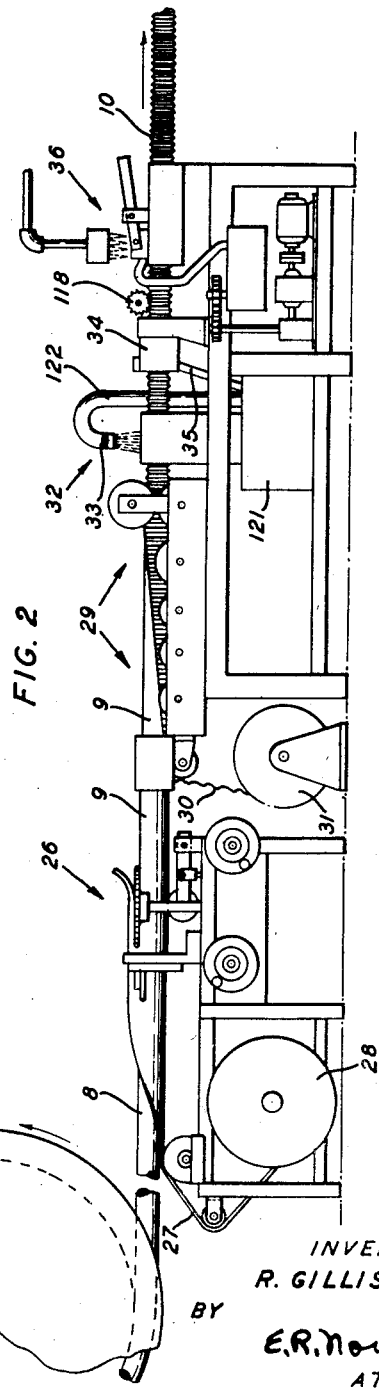
INVENTOR
R. GILLIS
BY
E.R. Nowlan
ATTORNEY Patented Jan. 25, 1949

2,459,877

UNITED STATES PATENT OFFICE 2,459,877

APPARATUS FOR MAKING MULTIPLY CABLE SHEATHS

Randall Gillis, Westfield, N. J., assignor to Western Electric Company, Incorporated, New York, N. Y., a corporation of New York Application April 25, 1944, Serial No. 532,613

1 Claim. (Cl. 113—33)

This invention relates to an apparatus for making cable, and more particularly to an apparatus for making electrical conductor cable with protective sheathing tight against gas, vapor or water.

Cable sheaths of extruded lead or suitable lead alloy have long been known and are eminently satisfactory in every way except that they add materially to the bulk and particularly to the mass of a cable, since they must be relatively thick because of the inherent softness of such material.

An object of the present invention is to provide an apparatus for making a cable having upon the core thereof a compound protection comprising one or more sheaths of thin metallic material, tougher, stronger and harder in nature than lead, together with a coacting layer of thermoplastic compound.

With the above and other objects in view, the invention may be embodied in an apparatus comprising means for forming a longitudinally seamed sheath about a longitudinally advancing core, turning the advancing sheathed core over to cause the seam of the sheath to lie along the opposite side of the core from the original position of the seam, and forming a second longitudinally seamed sheath about the first named sheath and with the seam of the second sheath on the opposite side of the core from the seam of the first sheath.

Other objects and features of the invention will appear from the following detailed description of an embodiment thereof taken in connection with the accompanying drawings, in which the same reference numerals are applied to identical parts in the several figures and in which:

Fig. 1 is a diagrammatic view in side elevation of roughly half of a machine for manufacturing cable, constructed in accordance with the invention to carry on the method of the invention; and Fig. 2 is a similar view of the remainder of the same machine.

In the illustrative apparatus herein disclosed, a cable core 6, coming from the right in Fig. 1 from a supply not shown, is met by a transversely corrugated metal tape 11 drawn from a supply reel 12. In the arrangement generally indicated at 14, the tape 11 is folded transversely of itself about the core 6 with the seams formed by the edges of the tape running longitudinally along the top of the core. A device comprising a box or tank 15 with a porous bottom and a pipe 16 to supply liquid flux from a source (not shown) then applies a liquid soldering flux to the tape edges forming the seam. The core and formed tape then pass together through a compacting die unit 17 in which the edges of the tape are first caused to overlap. A toothed wheel or gear 18 riding on the overlapped seam ensures that the corrugations of the overlapped tape edges are properly matched and interfitted. Following the gear 18 is a soldering device generally indicated at 19, in which the seam is filled and covered with molten solder and the edges are sealed together, forming the strand 7.

In the arrangement generally indicated at 20, the now sealed and completed metal sheath formed from the tape 11 is covered with an insulating and water repellent material whose principal purpose, however, is to fill the valleys between the corrugations on the outside of the metal sheath, partly to prevent these from forming channels for moisture to be distributed through should the outer sheathing be damaged by accident and partly to provide a smooth cylindrical base for the next member of the cable sheathing. The arrangement 20 may comprise a tank 21 heated by any suitable means (not shown) containing a supply of molten compound to be applied over the corrugated metal. This is pumped by means (not shown) through a delivery pipe 22 into a trough 23 through which the cable core with its corrugated metal sheath passes and is coated with an excess of the molten compound. The excessively coated strand passes thence through a wiping and compacting die 24. Excess coating material stripped from the strand by the die 24 and overflowing from the trough 23, falls into the tank 21 to be recirculated. One suitable compound for the coating material in the tank 20 may be made by softening the compound of which the next ensuing element 27 of the cable is made, with admixtures of asphalt, rosin oil and mineral oil, to the desired consistency.

From the die 24, the coated strand 8 passes to means to turn the strand over so that the just created sealed seam of the corrugated metal tape, uppermost as it emerges from the die 24, will henceforth run undermost in order that when a second corrugated metal tape 30 is subsequently applied, folded and soldered in a similar fashion, the two seams thus formed will lie substantially diametrically opposite to each other in the cable. As illustrated here, this means is a rotary element 25 rotatable about a horizontal axis and over which the strand 8 makes a turn of 180° as illustrated, or a little more, or any desired number of full turns plus a half turn, or a little more. This rotary element 25 may be thought of as a simple idler sheave; or it may be a driven sheave or a capstan to assist in propelling the cable; but in any case the strand must leave it travelling substantially in the opposite direction to that of its advance hitherto so that the strand will now be upside down with respect to its former orientation transversely of itself. The same result could be effected by twisting the cable one half turn while maintaining the same general direction of advance and this method of effecting the inversion of the strand is intended to be within the purview of the invention; but the preferred manner of achieving the inversion is that illustrated and described. As illustrated, and for simplicity of illustration, the portions of the whole apparatus before and after the element 25 are shown at different levels to allow the strand to approach and leave the element 25 horizontally and make just about a half turn thereon.

The strand 8 coming from the element 25 passes through an arrangement generally indicated at 26, in which a tape 27 of thermoplastic insulating and water repellent material, drawn from a supply 28, is cut to exact width and applied over the strand with its freshly cut edges squeezed firmly together in a seam along the top of the strand. One suitable material for this tape, and for the foundation material for the contents of the tank 21, may consist of 40 parts by weight of reclaimed natural rubber,
12 parts by weight of the hard hydrocarbon commercially known as mineral rubber,
43 parts by weight of clay,
4 parts by weight of cumar resin, and
1 part by weight of paraffin.

A characteristic of this compound is that freshly cut surfaces pressed together at ordinary temperatures tend to weld together, and such welding is substantially completely effected at a temperature somewhat above room temperature such as hereinafter described.

The strand 9 emerging from the unit 26 then enters a unit 29 identical in character and purpose with the unit 14 and in which a second transversely corrugated metal tape 30, drawn from a supply 31, is folded about the strand into a second metal sheath whose edges are spaced slightly apart along the top of this strand as this and the metal tape around it enter the device generally indicated at 32. This is an arrangement generally similar to that at 20, for supplying a molten compound to be poured through the opening between the spaced edges of the metal tape 30 to fill the annular space between the strand and the metal tape, the nose or nozzle 33 of the supply pipe 122 being formed to deliver the liquid in a thin sheet into the slot-like opening between the edges of the metal tape. The compound supplied by the device 32 is preferably one which is adhesive to the materials of both tapes 27 and 30 and also is such as not only not to interfere with the subsequent soldering of the edges of the tape 30 but to tend to act rather as a soldering flux. A suitable compound for this purpose may consist of 25% to 75% by weight of rosin,
20% to 50% by weight of rosin oil, and
5% to 25% by weight of polymerized isobutylene.

When exposed to soldering temperature, this mixture puffs away without leaving any residue to interfere with the soldering and apparently tends to assist by cleansing the metal surfaces.

The combination of the strand surrounded by the overlarge and sprung-open metal tape 30 with the compound just supplied filling the annular space between is then passed through a compacting and reducing die at 34 in which the tape 30 is squeezed down around the strand until the edges of the tape are overlapped a little too far and the diameter of the metal sheath so formed is a little less than its intended final value. Excess compound squeezed out by this die from between the strand and the tape returns to the tank 121 of the unit 32 through a pipe or trough 35.

The sheathed strand emerging from the die 24 passes under a toothed wheel 118 identical in structure and function with the wheel 18 and into a seam soldering unit 36 which is identical with the unit 19 in structure and function except that there is here no preheating means for the edges of the metal tape such as the burners 13 of the unit 19. From the soldering unit 36 the cable 10, finished so far as the present invention is concerned, passes on to some suitable advancing or propelling means (not shown).

The construction and mode of operation of the tape folding means at 14 and at 29, and of the soldering means at 19 and at 36, are no part of the present invention and so are neither illustrated nor described in detail here. Suitable apparatus for these two purposes are described and illustrated in detail respectively in U. S. Patent 2,156,952 of May 2, 1939 to William Morsing and in copending application Serial No. 532,612, filed of even date herewith by the present inventor and another, and now abandoned. Briefly, the soldering means comprises a pivoted and heated shoe pressed against the seam while solder is applied to the seam adjacent to the shoe in any desired manner. The specific structure of cable and the general method of making the same to the manufacture of which the present invention is particularly directed, are also no part of the present invention, being particularly disclosed and claimed in copending application Serial No. 532,-614, filed of even date herewith by the present inventor. Also, the specific structure and mode of operation of the die units 17 and 34 form no part of the present invention, being particularly described and claimed in U. S. Patent 2,214,624 of September 10, 1940 to William Morsing. In the same way, the specific structure and mode of operation of the arrangement at 26 for forming the thermoplastic tape 27 about the core are the subject matter of U. S. Patent 2,253,069 of August 19, 1941 to John F. Eckel and William Morsing.

Reviewing now the operation of the method and apparatus, a horizontally advancing core 6 is provided at 14, 15 and 19 with a transversely corrugated sheath of relatively thin and relatively light and tough metal, e. g. copper, brass, bronze, iron, aluminum or the like, formed from a corrugated tape folded about the core and with its edges soldered together in a seam running longitudinally along the top of the strand 7 so formed. The strand 7 is then coated with a suitable compound, e. g. as asphalt-rubber mixture in the device 20 and emerges with the seam of the metal sheath still on top, as the strand 8. This strand is then turned over, preferably in the manner described and illustrated to avoid twisting, so that the strand runs now with the seam of the metal sheath at the bottom. Next the thermoplastic tape 27 is formed about the strand 8 into a sheath or layer thereon to create the strand 9 with the seam of the thermoplastic layer, running longitudinally along the top of the strand and substantially diametrically opposite the seam of the metal sheath, which is at the bottom of the metal sheath. A second corrugated metal tape is formed about the strand 9 with its edges spaced slightly apart along the top of the strand and with its internal diameter somewhat larger than the external diameter of the strand 9 so that there is annular space between the strand 9 and the partially formed second metal sheath around it. This space is filled with a molten combination soldering flux and adhesive compound pumped by the unit 32 into the space through the slot between the spaced edges of the metal tape. The rate of supply of this molten compound is so adjusted to the speed of advance of the strand that the amount of compound provided is barely more than sufficient to fill the inner corrugations of the tape when this is subsequently closed and sealed. In passing through the die 34, the tape is closed a little more tightly around and against the strand 8 than the tape is intended to be when finally sealed, for the die is a little smaller in diameter than the finished overall diameter of the sealed tape. In passing through this die 34 therefore, the edges of the tape are overlapped a little more than they are to be later and the molten compound is forced to fill all the inner corrugations of the tape completely and some of it is forced out between the overlapped edges of the tape. On emerging from the die 34 and passing into the control of the soldering unit 36, the tape springs back to its ultimate size, to which it is held by the unit 36, and that portion of the molten adhesive flux remaining between the overlapped tape edges is sucked back into the annular space under the tape generally leaving only a thin film on the overlapping portions of the tape, insufficient to interfere with the soldering by its bulk but still sufficient to have a fluxing effect. The soldering is then effected to complete the cable 10.

In the cable as thus made, there is a core upon which is a lightweight, tough, strong and flexible, impervious sheath of transversely corrugated, relatively thin metal, having a soldered seam running in a substantially straight line along the cable. Over this metal sheath is a layer of thermoplastic insulation having a welded seam running in a substantially straight line along the cable and on the opposite side of the underlying metal sheath from the soldered seam of the sheath. Over the thermoplastic layer is a second metal sheath identical in structure and character with the first one, the soldered seam of this second metal sheath being located substantially directly coinciding in position with the welded seam of the thermoplastic layer and hence diametrically opposite to the soldered seam of the first metal sheath.

A primary object of the invention is the production on a cable core of a compound protective sheath comprising this combination of the three elements just described, two longitudinally seamed sheaths of transversely corrugated metal tape whose seams are substantially diametrically opposite each other, together with a longitudinally seamed thermoplastic layer between the metal sheaths, whose seam is substantially coincident with the seam of the outer metal sheath. Hence the basically characterizing feature of the invention comprises the steps of or the means for forming and sealing the first metal tape about the core and with the seam of the tape on top, turning the strand so formed over to bring the seam to lie along the bottom of the strand, forming the thermoplastic tape around the strand with the seam along the top, and forming and sealing the second metal tape over the thermoplastic layer with the seam of the second metal tape also on top.

A further possible modification and refinement cannot well be shown on the drawing since the exaggeration necessary to make it visibly evident would give a totally false impression. This consists in so arranging the units 26, 29, 32, 34 and 118 that the path of the strand through these consecutive units, while substantially in a straight line, slopes downward by a few degrees toward the unit 36, while in the latter unit this path is held horizontal. Between the unit 118 and the unit 36, the path of the strand is arcuately bowed by a small amount with the concavity of the arc upward. This tends to cause the as yet unsealed seam between the overlapped edges of the outer metal sheath to open a trifle vertically, in addition to the small lateral opening out due to emergence from the die 34, thus aiding the sucking away of the molten compound from between the edges as described above and the introduction of molten solder between the tape edges. On the other hand, if the strand path from unit 26 through unit 118 be tilted a few degrees upwardly and then made horizontal through the unit 36, the resultant arcuate bowing of the outer metal tape tends to close the as yet unsealed seam of the tape and thus to aid the gear wheel 118 in maintaining correct registry of the corrugated tape edges. Need for the application of one or the other of these refinements will or will not appear according to the stiffness and resilience of the particular metal tape in any given instance.

What is claimed is:

An apparatus for making electrical conductor cable in one continuous operation and comprising a sequence of forming rolls to fold a longitudinally advancing tape of sheath material about a longitudinally and horizontally advancing core into a sheath on the core and having a seam therein running longitudinally along the top of the sheath, a nozzle to apply sealing material to the seam of the sheath on the advancing core, a heated member pressed against the seam of the sheath on the advancing core to cause the sealing material to seal the same hermetically, a guide sheave to receive the advancing sheathed core and lead the same through an arcuate path to advance longitudinally and horizontally with the seam of the sheath on the bottom of the sheathed core, and a second sequence of forming rolls to fold a longitudinally advancing tape of sheath material about the longitudinally and horizontally advancing sheathed core into a second sheath over the first sheath and having a seam therein running longitudinally along the top of the second sheath, a second nozzle to apply sealing material to the seam of the second sheath on the advancing core, and a second heated member pressed against the seam of the second sheath on the advancing core to cause the sealing material to seal the same hermetically.

RANDALL GILLIS.

REFERENCES CITED

The following references are of record in the file of this patent:

UNITED STATES PATENTS

| Number | Name | Date |
| --- | --- | --- |
| 275,826 | Holmes | Apr. 17, 1883 |
| 289,725 | Tainter | Dec. 4, 1883 |
| 661,108 | Schmitz | Nov. 6, 1900 |
| 1,233,807 | Read | July 17, 1917 |
| 1,514,292 | Knoderer | Nov. 4, 1924 |
| 1,972,756 | Blaisdell | Sept. 4, 1934 |
| 2,088,446 | Specht | July 27, 1937 |
| 2,090,744 | Boe | Aug. 24, 1937 |
| 2,121,942 | Barrett | June 28, 1938 |